US012478521B2

(12) United States Patent
Cardona et al.

(10) Patent No.: US 12,478,521 B2
(45) Date of Patent: Nov. 25, 2025

(54) WHEELCHAIR LOCATION SENSING DEVICE FOR A WHEELCHAIR ACCESSIBLE VEHICLE

(71) Applicant: VALEDA COMPANY, Oakland Park, FL (US)

(72) Inventors: Edgardo Cardona, Pompano Beach, FL (US); Patrick Girardin, Ft. Lauderdale, FL (US)

(73) Assignee: Valeda Company, LLC, Oakland Park, FL (US)

( * ) Notice: Subject to any disclaimer, the term of this patent is extended or adjusted under 35 U.S.C. 154(b) by 292 days.

(21) Appl. No.: 18/303,081

(22) Filed: Apr. 19, 2023

(65) Prior Publication Data

US 2023/0248591 A1 Aug. 10, 2023

Related U.S. Application Data

(63) Continuation of application No. 15/605,872, filed on May 25, 2017, now Pat. No. 11,660,238.

(Continued)

(51) Int. Cl.

*A61G 3/06* (2006.01)
*A61G 3/08* (2006.01)

(Continued)

(52) U.S. Cl.

CPC ........... *A61G 3/061* (2013.01); *A61G 3/0808* (2013.01); *B66D 3/006* (2013.01); *B66F 7/243* (2013.01);

(Continued)

(58) Field of Classification Search

CPC ........ A61G 3/061; A61G 3/0808; A61G 3/08; A61G 2203/30; B66D 3/006; B66D 1/48;

(Continued)

(56) References Cited

U.S. PATENT DOCUMENTS

| | | | |
|---|---|---|---|
| 745,013 | A | 11/1903 | Heisey |
| 1,709,153 | A | 4/1929 | Pownall |

(Continued)

FOREIGN PATENT DOCUMENTS

| | | | |
|---|---|---|---|
| DE | 2826204 | A1 | 3/1980 |
| EP | 2016925 | A1 | 1/2009 |

(Continued)

OTHER PUBLICATIONS

EP 2839820 A1—machine translation (Year: 2015).*

(Continued)

*Primary Examiner* — Dino Kujundzic

(74) *Attorney, Agent, or Firm* — Daniel Tallitsch; Tyler Schultz

(57) ABSTRACT

Provided herein is a controller configured to determine the position, direction, or speed of a wheelchair during ingress or egress in a wheelchair accessible vehicle. The controller may receive input from any combination of sensors configured to provide signals indicative of the wheelchair position, direction, or speed, such as cameras, light curtains, and floor pressure sensors. The controller can be configured to sense and correct unsafe conditions, such as the wheelchair approaching an edge of a ramp, and to sense when the wheelchair has reached a final securement position and/or has departed the vehicle.

20 Claims, 15 Drawing Sheets

Related U.S. Application Data

(60) Provisional application No. 62/341,570, filed on May 25, 2016.

(51) Int. Cl.
*B66D 3/00* (2006.01)
*B66F 7/24* (2006.01)
*B60P 3/079* (2006.01)

(52) U.S. Cl.
CPC ................ *A61G 3/08* (2013.01); *B60P 3/079* (2013.01); *B60Y 2200/84* (2013.01)

(58) Field of Classification Search
CPC . B66D 1/60; B66F 7/243; B60P 3/079; B60Y 2200/84; B60Y 2200/126; B60Y 2400/301
See application file for complete search history.

(56) References Cited

U.S. PATENT DOCUMENTS

| | | | |
|---|---|---|---|
| 2,816,733 | A | 12/1957 | Du |
| 2,854,852 | A | 10/1958 | Clark |
| 3,031,168 | A | 4/1962 | Carlo |
| 3,163,400 | A | 12/1964 | Skerry |
| 3,224,735 | A | 12/1965 | Linde |
| 3,868,091 | A | 2/1975 | Hoffman |
| 3,939,729 | A | 2/1976 | Brockelsby |
| 4,129,267 | A | 12/1978 | Degras et al. |
| 4,153,274 | A | 5/1979 | Rogers, Jr. et al. |
| 4,446,587 | A | 5/1984 | Jump |
| 4,591,029 | A | 5/1986 | Da Foe |
| 4,623,289 | A | 11/1986 | Apostolos |
| 4,655,312 | A | 4/1987 | Frantom et al. |
| 4,723,757 | A | 2/1988 | Steinman et al. |
| 4,770,394 | A | 9/1988 | Yang |
| 4,830,310 | A | 5/1989 | Higbee |
| 4,938,431 | A | 7/1990 | Smithson |
| 4,977,795 | A | 12/1990 | McVey |
| 5,044,575 | A | 9/1991 | Knabel et al. |
| 5,494,387 | A | 2/1996 | Ruegg |
| 5,553,548 | A | 9/1996 | Eaton |
| 5,694,654 | A | 12/1997 | Roy |
| 5,730,384 | A | 3/1998 | Foehl |
| 6,158,685 | A | 12/2000 | Kielwein et al. |
| 6,287,060 | B1 | 9/2001 | Girardin |
| 6,494,435 | B1 | 12/2002 | Cauchon |
| 6,598,859 | B1 | 7/2003 | Kureck et al. |
| 6,698,983 | B1 | 3/2004 | Kiernan et al. |
| 6,899,497 | B2 | 5/2005 | Cardona et al. |
| 7,562,862 | B1 | 7/2009 | Jackson |
| 7,717,655 | B2 | 5/2010 | Cardona |
| 9,302,190 | B1 | 4/2016 | Jennings |
| 9,333,129 | B2 | 5/2016 | Cardona et al. |
| 9,554,625 | B2 | 1/2017 | Latuszek et al. |
| 9,908,756 | B2 | 3/2018 | Heravi et al. |
| 10,130,529 | B2 | 11/2018 | Gale |
| 10,294,087 | B2 | 5/2019 | Hall et al. |
| 10,512,571 | B2 * | 12/2019 | Carletti ..................... B60R 1/26 |
| 11,191,681 | B2 | 12/2021 | Cardona et al. |
| 11,660,238 | B2 | 5/2023 | Cardona et al. |
| 2002/0114679 | A1 | 8/2002 | Craft |
| 2003/0190208 | A1 | 10/2003 | Cardona et al. |
| 2006/0110230 | A1 | 5/2006 | Girardin |
| 2006/0169957 | A1 | 8/2006 | Gilman |
| 2007/0086879 | A1 | 4/2007 | Goodrich et al. |
| 2007/0221897 | A1 | 9/2007 | Cardona |
| 2008/0017839 | A1 | 1/2008 | Boda et al. |
| 2008/0079252 | A1 * | 4/2008 | Shutter ................ A61G 3/0808 280/755 |
| 2008/0128668 | A1 | 6/2008 | Fofonoff et al. |
| 2011/0008140 | A1 | 1/2011 | Hansen et al. |
| 2012/0068131 | A1 | 3/2012 | Latoria |
| 2012/0068133 | A1 | 3/2012 | Ozarski |
| 2012/0237326 | A1 * | 9/2012 | Van Ness ............. A61G 3/0236 414/812 |
| 2013/0088348 | A1 * | 4/2013 | Verachtert ............... G06F 11/30 434/308 |
| 2014/0117137 | A1 | 5/2014 | Diamond |
| 2014/0271019 | A1 | 9/2014 | Bell |
| 2014/0271020 | A1 | 9/2014 | Girardin et al. |
| 2014/0356090 | A1 | 12/2014 | Cardona |
| 2014/0369778 | A1 | 12/2014 | Hermanson et al. |
| 2015/0328067 | A1 | 11/2015 | Girardin et al. |
| 2016/0082921 | A1 | 3/2016 | Sun |
| 2017/0119602 | A1 | 5/2017 | Cardona et al. |
| 2017/0313233 | A1 | 11/2017 | Mcnally |
| 2018/0118088 | A1 | 5/2018 | Cardona et al. |
| 2020/0093662 | A1 | 3/2020 | Mori |
| 2020/0113754 | A1 | 4/2020 | Girardin et al. |

FOREIGN PATENT DOCUMENTS

| | | | | |
|---|---|---|---|---|
| EP | 2564824 | A2 | 3/2013 | |
| EP | 2564824 | A3 | 10/2013 | |
| EP | 2839820 | A1 * | 2/2015 | ........... A61G 3/0245 |
| GB | 2451154 | A | 1/2009 | |
| GB | 2551309 | A | 12/2017 | |
| JP | H08175382 | A * | 7/1996 | |
| JP | 2006280400 | A | 10/2006 | |
| JP | 2013035623 | A | 2/2013 | |
| KR | 101291249 | B1 * | 7/2013 | |

OTHER PUBLICATIONS

JP H08175382 A—machine translation (Year: 1996).*
KR 101291249 B1—machine translation (Year: 2013).*
“Hook-i Tech Rachin and Winchin Wheelchair Restraints” dated Mar. 1, 2010, prepared by Hook i TECH, Lambert House, Beer Hackett, Sherborne, Dorset, UK, DT9 6QP.
Japanese Patent Office, Notice of Reasons for Rejection of Japanese Patent Application 2022-004136, dated Mar. 28, 2023.
Photographs from the HCR Exhibition in Tokyo, Oct. 12-14, 2016.

* cited by examiner

WHEELCHAIR LOCATION SENSING DEVICE FOR A WHEELCHAIR ACCESSIBLE VEHICLE

CROSS REFERENCE TO RELATED APPLICATIONS

This application is a continuation of U.S. patent application Ser. No. 15/605,872, filed on May 25, 2017, which claims priority to U.S. Provisional Patent Application No. 62/341,570, filed on May 25, 2016, the contents of which are incorporated herein by reference.

FIELD OF THE DISCLOSURE

The embodiments described and claimed herein relate generally to a wheelchair accessible vehicle having a wheelchair securement system and a controller configured to detect the location, direction, and/or speed of a wheelchair during a loading and unloading operation.

BACKGROUND

Vehicles, especially in the European Union, are getting smaller. With the limited space in these vehicles, proper use of a wheelchair securement system becomes difficult. In small spaces, such as the space in rear-entry, wheelchair accessible vehicle (which makes up a large majority of the personal mobility wheelchair accessible vehicles), it is important that the wheelchair securement system is simple and safe to use. Occupants in wheelchairs who are not able to transfer or move into a vehicle chair usually depend on the wheelchair securement assemblies (also referred to as wheelchair tie-downs or wheelchair tie-down assemblies) to safely secure their wheelchair while traveling.

Existing securement systems used in smaller, more compact vehicles with tight and confined wheelchair spaces suffer from many drawbacks, some of which are described below. Rear-entry vehicles, such as the Citroen Berlingo, Nissan NV200, and Peugeot Expert (also known as or referred to as rear-entry wheelchair accessible vehicles, WAV, M1, or mini-vans), in general, do not offer much space for the front of a wheelchair to be secured after it is in place in the securement area of the vehicle. These vehicles provide only a small "wheelchair pan" (or securement area) in the rear of the vehicle for securing the wheelchair. See, in particular, U.S. Pat. No. 9,333,129 to Cardona et al., which is incorporated in its entirety by reference. As such, it is important for a fully integrated system in a rear-entry vehicle to be useable from behind the wheelchair passenger as much as possible.

In addition, rear-entry vehicles often have ramps and sloping floors (some at about 16°) which create a challenge in terms of strength requirements to push a heavy passenger and wheelchair up into the vehicle, and sometimes lead to injuries for the vehicle driver and/or the wheelchair passenger. Operators face similar challenges when removing the wheelchair passenger from the vehicle; wheelchair passengers must be carefully supported while descending the incline to avoid "dropping" the occupant. To address this problem, additional devices such as a front electrical winch are used to aid entry into the vehicle. These electrical winches, however, do not fully solve the problem. The winches are provided with long cables or straps (e.g., webbing) that can extend outside of the vehicle for attachment to the front of the wheelchair. The winches are then used to pull the wheelchair up the ramp. To keep the wheelchair aligned on the ramp, however, the vehicle driver must still steer or guide the wheelchair up the vehicle ramp by hand. This occurs frequently not only because vehicles rarely park on perfectly even surfaces, but also because wheelchairs are not normally balanced in weight, sometimes have uneven tire pressure, sometimes have additional accessories or lean causing it to go off course, and/or have wheel casters that alter the direction of the wheelchair. The risk of injury, therefore, to both the driver and wheelchair passenger has not been fully mitigated by the use of electrical winches.

Moreover, the electrical winches of the prior art are typically not adequate to secure the wheelchair once positioned in the vehicle. For that reason, the prior art systems typically utilize separate front tie-downs as necessary additional components to adequately secure the wheelchair.

SUMMARY OF THE EMBODIMENTS

The embodiments described and claimed herein solve at least some of the problems of the prior art. For example, one embodiment comprises two front, electronically-controlled retractor units that would be able to fit underneath the front seats or other structures in the vehicle. These retractors would have three core functions: (1) to work as a wheelchair front tie-down and secure the wheelchair during transportation and in the event of a crash restrain the wheelchair (during front and rear impact); (2) to lock or tension the webbing/material in the retractor such that rearward excursion in the event of a crash is kept to a minimum; and (c) to function as a winch and move the wheelchair and passenger into and out of a vehicle in a controlled manner.

It is contemplated that the electronically-controlled retractor units would allow the operator (e.g., the vehicle driver or attendant) to load and secure a passenger safely from outside of the vehicle, without having to push, pull, or steer the passenger in/out of the vehicle by hand. In particular, with the rear-entry vehicle ready to accommodate the wheelchair passenger, the operator will pull the front tie-downs from the retractor down the ramp and outside of the vehicle. The operator will attach the tie-downs onto the front structural members of the wheelchair (the wheelchair passenger will, of course, be present at the bottom of the ramp with wheels unlocked, but need not be perfectly aligned as with prior art systems). The operator will remotely activate the retractor units using a wired pendant or wireless control module (e.g., radio, wi-fi, Bluetooth, etc.). The retractor units are motorized and will pull the passenger up the ramp and into the vehicle. The operator controls the ascension speed and steers the wheelchair up the ramp by use of a thumbstick on the pendant/remote, and will stop the unit by releasing the thumbstick once the wheelchair passenger is located within the securement area of the vehicle. The operator will affix rear securements (e.g., manual belts, retractors, or other cable or strap devices) to the rear structural members of the wheelchair. The operator will then operate the motorized front retractor units to remove slack from and tension all restraints in the system, and apply occupant restraints to secure the occupant in the wheelchair. The wheelchair and occupant will then be properly secured by the system, at which point the wheelchair passenger is free to be transported to his/her destination. Upon arrival, the above steps are reversed in order to egress the wheelchair passenger.

Other embodiments, which include some combination of the features discussed above and below and other features which are known in the art, are contemplated as falling within the scope of the patent even if such embodiments are not specifically identified and discussed herein.

BRIEF DESCRIPTION OF DRAWINGS

These and other features, aspects, objects, and advantages of the embodiments described and claimed herein will become better understood upon consideration of the following detailed description, appended claims, and accompanying drawings where:

Figure 1:
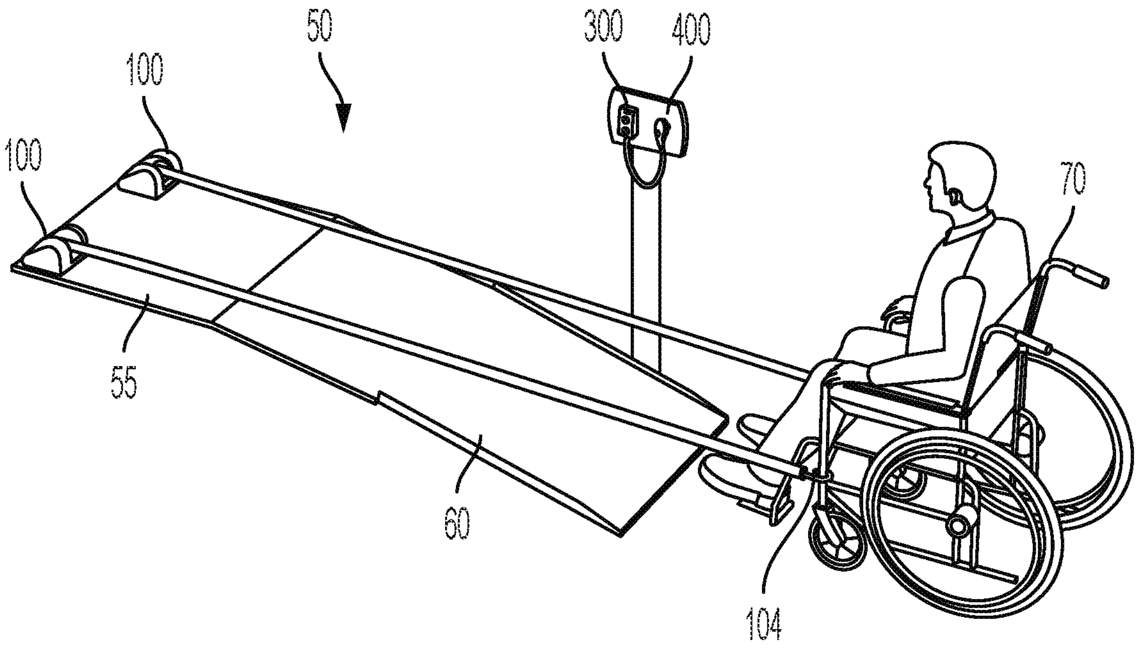
FIG. 1 is perspective view of a first embodiment of an incline tie-down system in its initial phase.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE EMBODIMENTS

Referring first to FIGS. 1-5, the incline tie-down system 50 of the first embodiment comprises, but is not limited to, two electronically-controlled front tie-down units 100, a controller 200, a control panel 300, a joystick 400, and two rear tie-down units 500. The incline tie-down system 50 is adapted for use in a wheelchair pan 55 of a rear entry vehicle for loading and restraining a wheelchair 70, but is not limited to that particular application.

In particular, the two front tie-down units 100 and the two rear tie-down units 500 serve as a four-point wheelchair securement system for securing the wheelchair 70 in the vehicle. As described in more detail below, however, the front tie-down units 100 serve an additional function of winching the wheelchair 70 up and down the vehicle ramp 60 in a controlled and steerable manner. For the avoidance of doubt, it is contemplated that the novel features of the present system can be incorporated in systems that utilize more or less than four points of attachment to the wheelchair.

As shown in FIGS. 6-11, a first embodiment of the front tie-down units 100 comprises a motorized retractor that is capable of being independently controlled. The front tie-down units 100 may be essentially mirror images of each other, each comprising a ratcheted spool 110 for holding wound restraints 102. An adjustable restraint sensor is provided to detect the amount of restraint 102 on the spool 110. More particularly, in the disclosed embodiment, the restraint sensor includes a roller member 120 that rides on the surface of the restraint 102 to, in effect, sense the diameter of the restraint 102 that is coiled on the spool 110. In the disclosed embodiment, the roller member 120 engages a contact switch 125 when the diameter of the restraint 102 on the spool 110 increases to a certain limit, whereby the controller 200 can react to disable the motors of the front tie-down units 100 and prevent damage to the passenger, wheelchair 70, tie-down system 50, and/or vehicle. See, in particular, FIGS. 8 and 9, where the roller member 120 is pushed by the restraint 102 into engagement with the contact switch 125, and FIGS. 10 and 11, where the spool is empty and the roller member 120 is not engaged with contact switch 125. Notably, the contact switch 125 is position adjustable using screw 128, so the sensor limit can be set based on application-specific space constraints. It is contemplated, however, that other equivalent sensors can be used, including those that use optics or other sensor technology to determine the spool size. In addition, it is contemplated that a similar sensor could be used to determine when the wheelchair 70 is located in various positions within the application, such as in an optimal position in the vehicle, mid-way up the ramp 60 or located at the base of the ramp such as the street-level. This sensor could be used in combination with, or in the alternative to, a sensor designed to prevent damage or injury, as described above.

Figure 10:
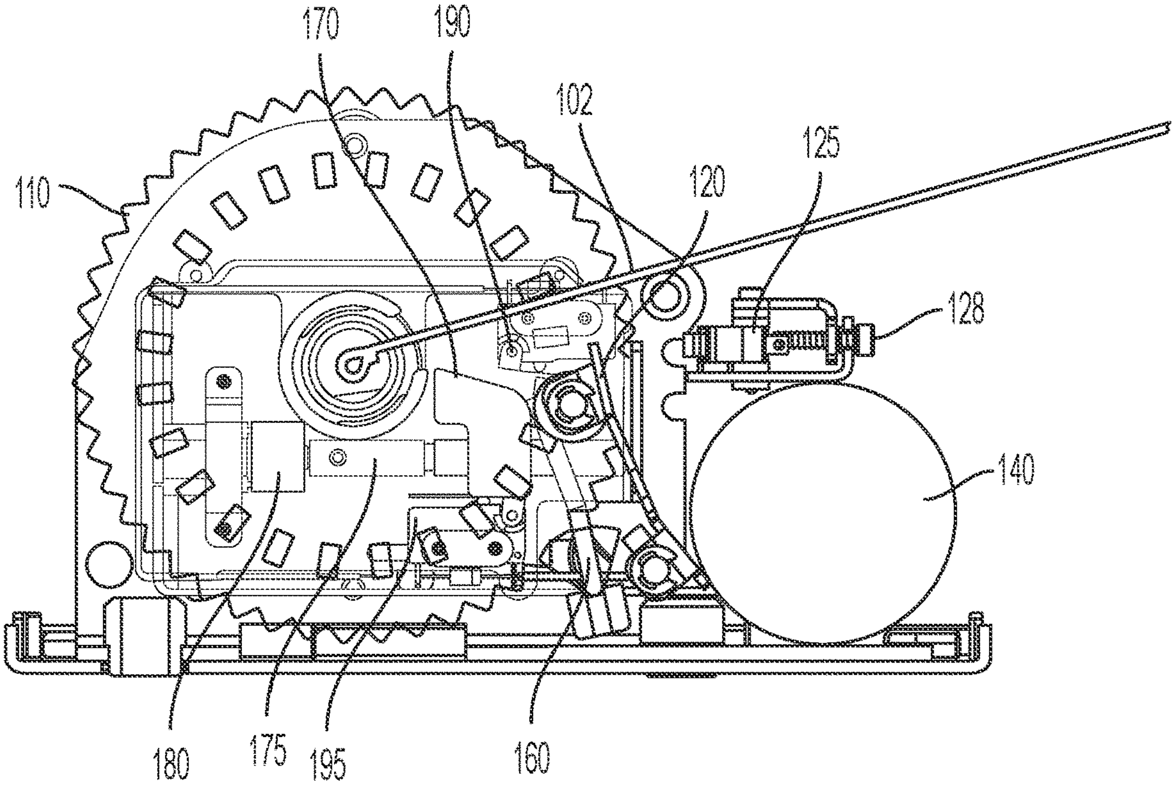
FIG. 10 is a first cross-sectional, partially transparent view of the left, front tie-down unit (cover removed) with an empty spool and the pawl in the locked position.
Figure 11:
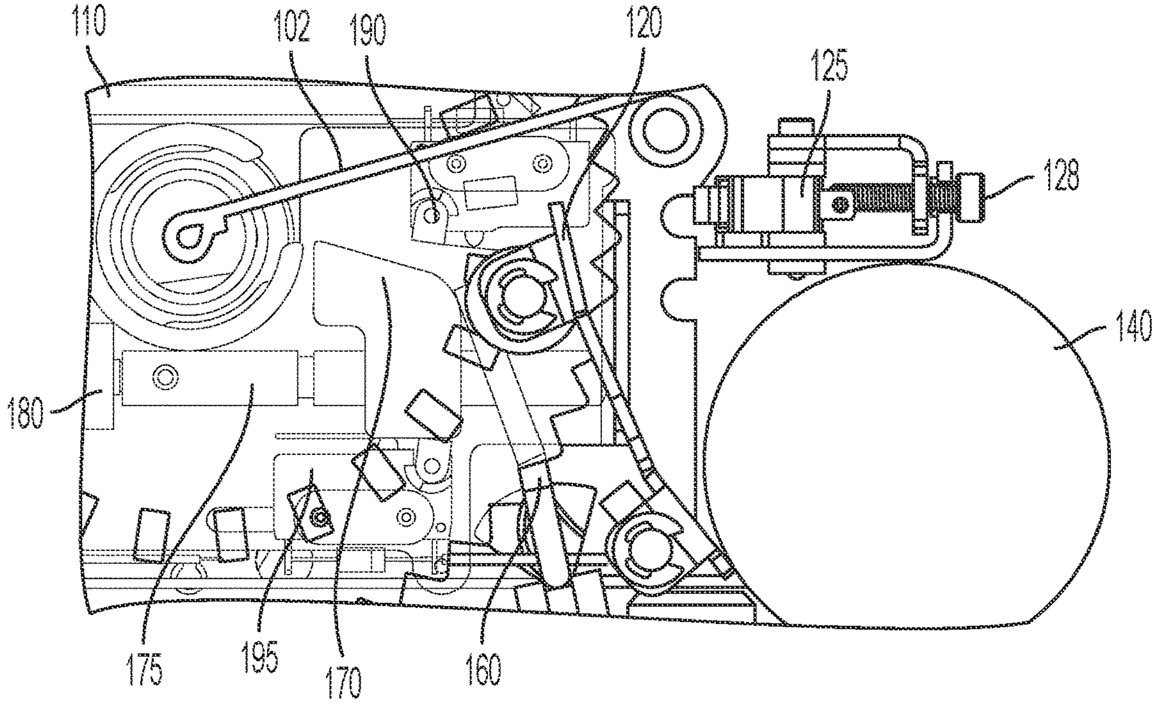
FIG. 11 is a second, enlarged cross-sectional, partially transparent view of the left, front tie-down unit (cover removed) with an empty spool and the pawl in the locked position.

The ratcheted spool 110 is spring-biased by power spring assembly 130 to retract restraints 102, and is powered in both rotational directions by a motor 140 through a speed-reducing gear and chain mechanism 150. A locking pawl 160 is provided with a spring for engagement with the sprockets of the ratcheted spool 110. In its default, spring-biased position (as shown in FIGS. 10 and 11), the locking pawl 160 engages with the ratcheted spool 110 and prevents the restraint 102 from being pulled out of the tie-down unit. However, the locking pawl 160 is movable via a release mechanism shown in FIGS. 8-11 to an unlocked position whereby restraint 102 may be unwound from spool 100 and pulled out of the tie-down unit 100. In substance, the release mechanism employs a nut 170 that traverses a portion of the length of a threaded shaft 175 powered by a gear motor 180. At one end of its range, the nut 170 is configured to engage with and push the locking pawl 160 out of engagement with the ratcheted spool 110 until it triggers a first contact switch (or proximity switch or other equivalent sensor) 190 (See FIGS. 8 and 9). At the other end of its range, the nut 170 triggers a second contact switch (or proximity switch or other equivalent sensor) 195, where the nut 170 is out of engagement with or otherwise allows the locking pawl 160 to engage with the sprocket of the ratcheted spool 110 (See FIGS. 10 and 11).

Figure 8:
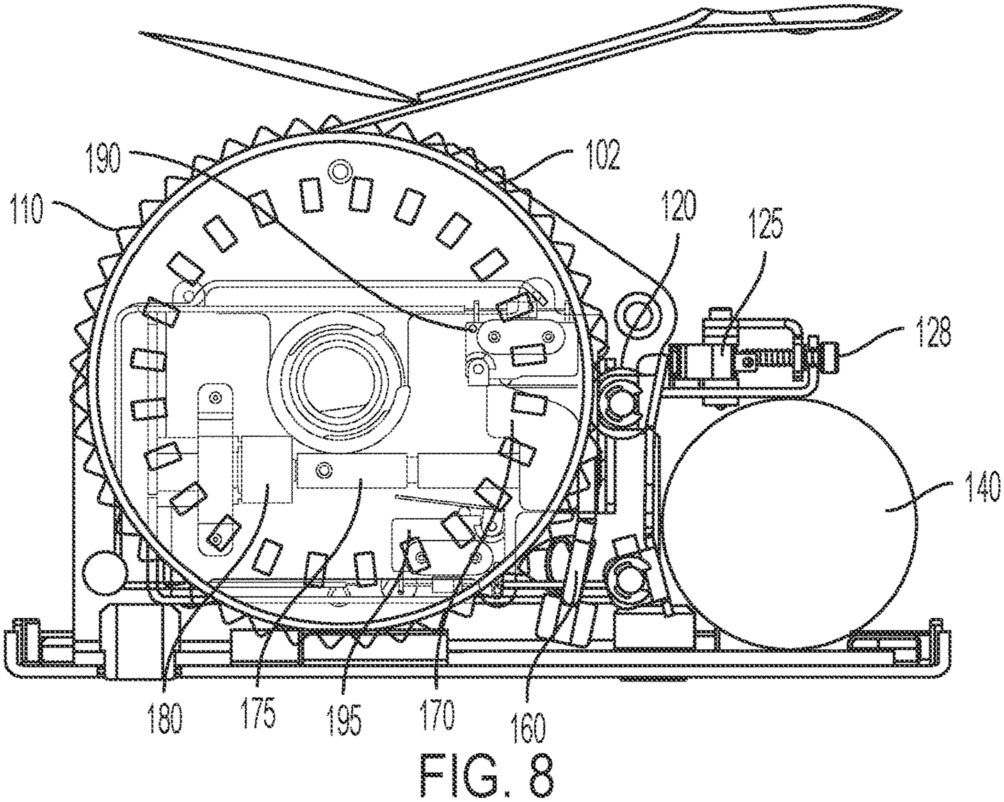
FIG. 8 is a first cross-sectional, partially transparent view of the left, front tie-down unit (cover removed) with a full spool and the pawl in the released position.
Figure 9:
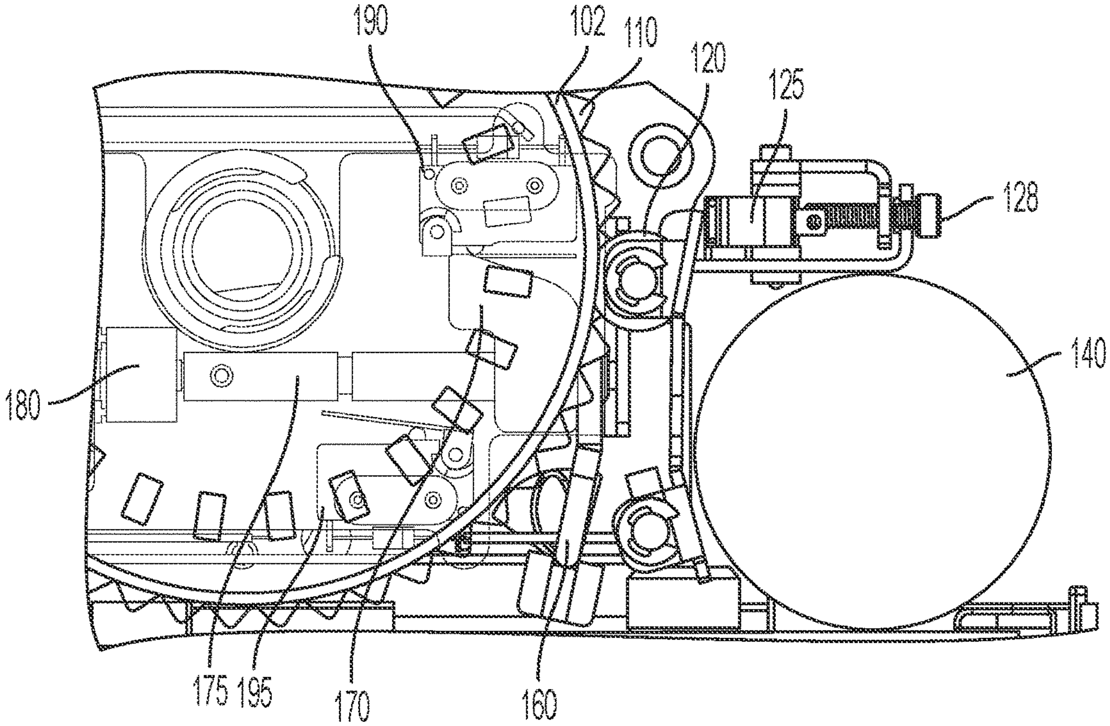
FIG. 9 is a second, enlarged cross-sectional, partially transparent view of the left, front tie-down unit (cover removed) with a full spool and the pawl in the released position.
Figure 26:
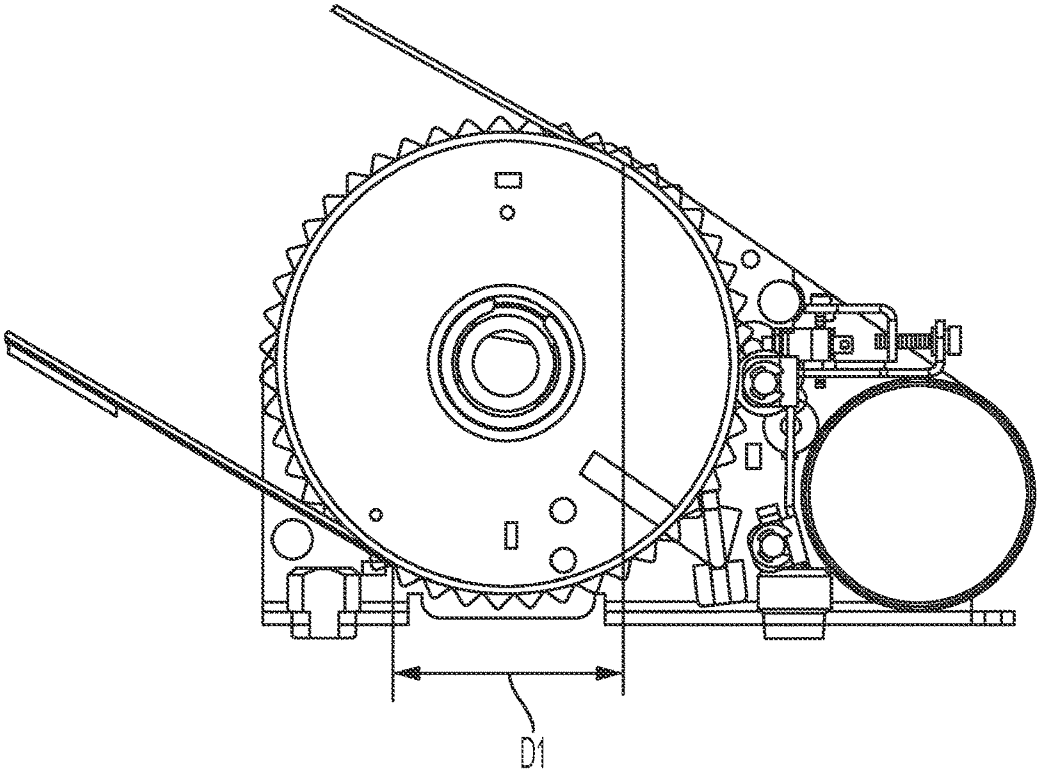
FIG. 26 is a side view of the internal components of an embodiment of a tie-down unit that presents the spool at a front side of the tie-down unit (adjacent the wheelchair securement area, as in the embodiment of FIG. 1), and demonstrates the space savings achieved by taking the webbing off of the top of the spool.
Figure 27:
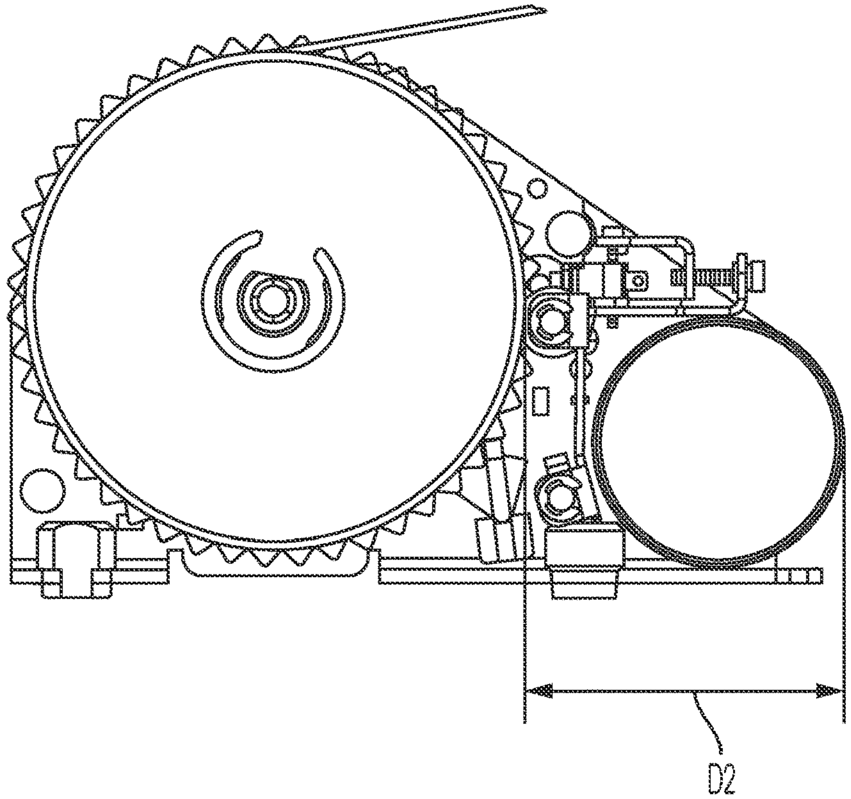
FIG. 27 is a side view of the internal components of an embodiment of a tie-down unit that presents the spool at a rear side of the tie-down unit (opposite the wheelchair securement area, as in the embodiment of FIG. 6), and demonstrates the space savings achieved by placing the motor between the spool and the wheelchair securement area; and, FIG. 28 is a top view of an embodiment of an embodiment of an incline tie-down system which demonstrates the space savings achieved by using two spaced tie-down units, as opposed to a single, centrally-located winch unit.
Figure 28:
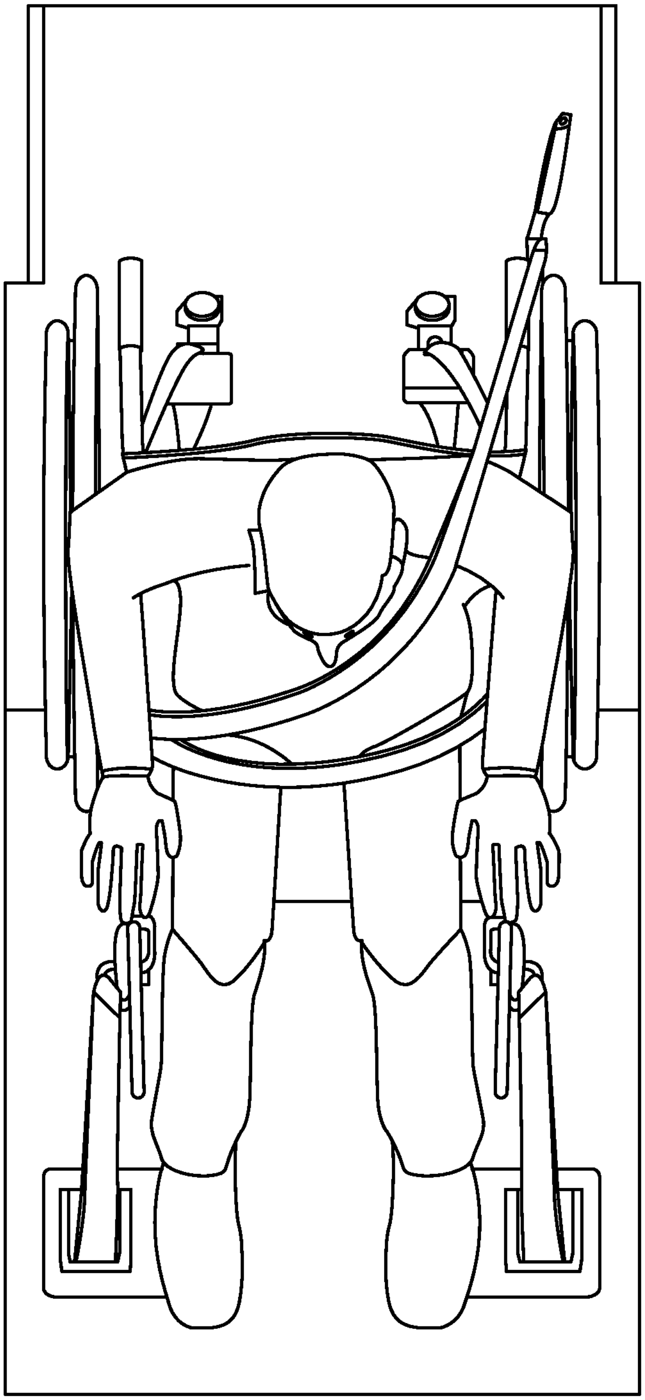

As shown in FIGS. 1-4 and 6-11, the restraint 102 is wound around the ratcheted spool 110 so that it leaves from the top of the spool. In addition, as shown in FIGS. 6-11, the ratcheted spool 110 is disposed at an end or side of the tie-down unit 100 opposite from the wheelchair 70, whereby the motor 140 is disposed between the ratcheted spool 110 and the wheelchair 70. The ratcheted spool 110 would be disposed at a rear end or side of the tie-down unit 100 (e.g., in an intended configuration, toward the front of the vehicle). As discussed in more detail in U.S. patent application Ser. No. 15/339,360, which is incorporated by reference, this configuration may provide space savings in a wheelchair securement system, where webbing ideally should extend between the retractor and the wheelchair at an angle of approximately 35-55°, when compared to prior art systems that present webbing off of the bottom of the spool and present the spool at the front end or side of the tie-down unit that is closest/proximal to the wheelchair. The space savings achieved by the designs shown in FIGS. 1 and 8 are best depicted in FIGS. 26-28. As shown specifically in FIG. 26, by taking the webbing off of the top of the ratcheted spool 110, rather than the bottom of the spool, the take-off point from the spool shifts to the trailing end of the spool (toward the front of the vehicle or at the point furthest from the wheelchair, in an intended configuration), rather than the leading end of the spool, and a space savings of approximately D1 is realized. In other words, the size of the wheelchair securement area necessary to properly secure a wheelchair can be reduced by an approximate length of D1 by taking the webbing off of the top of the ratcheted spool 110, rather than off the bottom. In addition, as shown specifically in FIG. 27, by disposing the motor 140 between the ratcheted spool 110 and the wheelchair 70, where the ratcheted spool 110 is disposed at the rear end or side of the tie-down unit 100, an additional space saving of approximately D2 is realized. In other words, the size of the wheelchair securement area necessary to properly secure a wheelchair can be reduced by an approximate length of D2 by positioning the ratcheted spool 110 at the rear end or side of the tie-down unit 100 opposite the wheelchair securement area.

Figure 2:
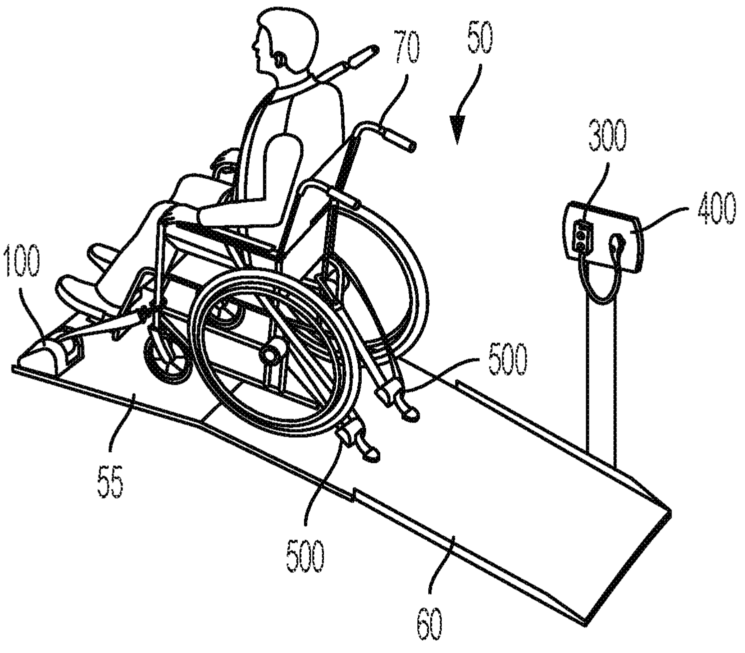
FIG. 2 is a perspective view of the first embodiment of the incline tie-down system in its wheelchair secured phase.
Figure 3:
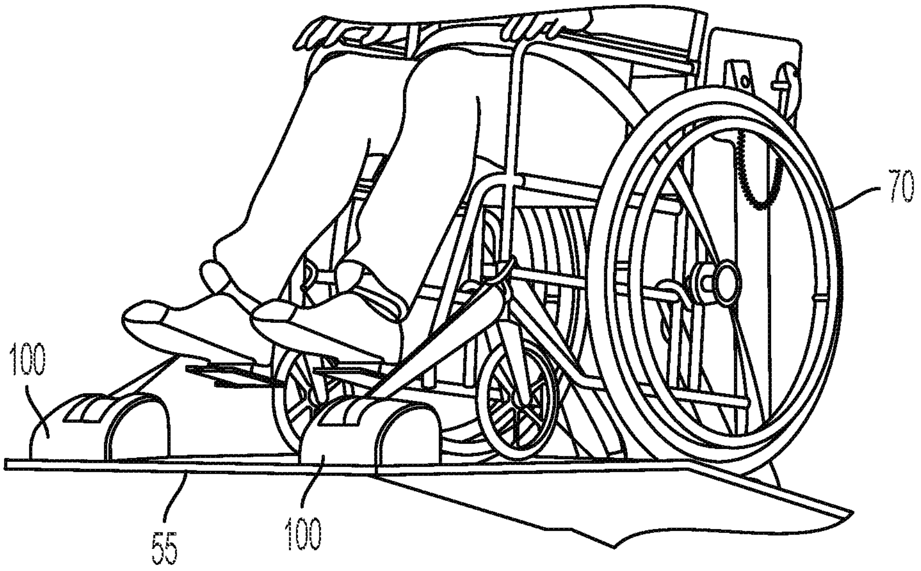
FIG. 3 is a close-up perspective view of the front side of the first embodiment of the incline tie-down system in its wheelchair secured phase.
Figure 4:
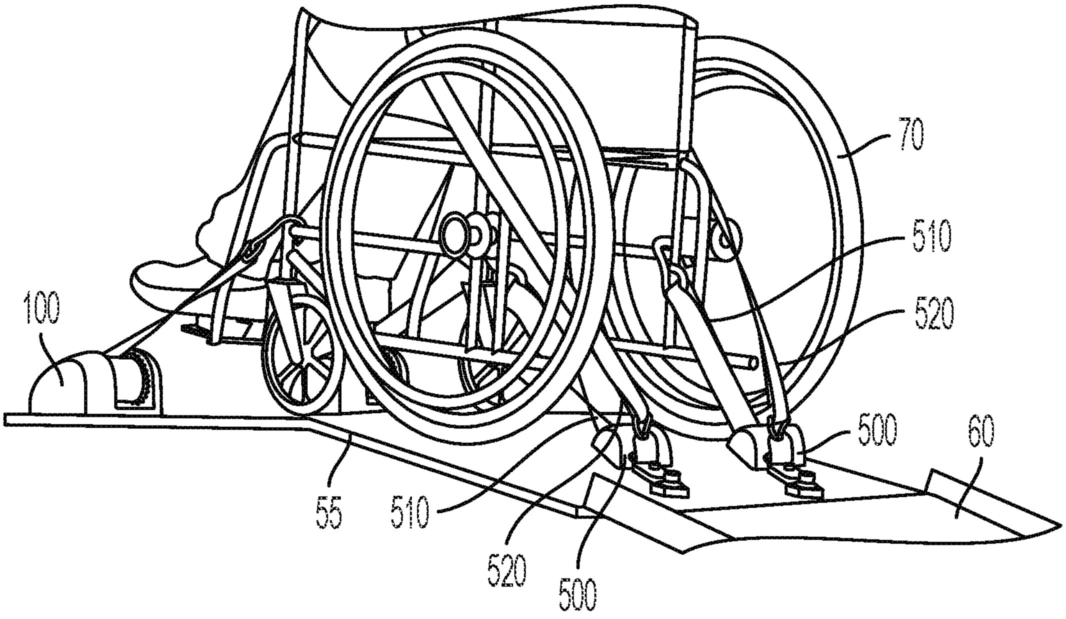
FIG. 4 is a close-up perspective view of the rear side of the first embodiment of the incline tie-down system in its wheelchair secured phase.

Additionally, as specifically shown in FIGS. 2-3 and 28, space savings may be realized by the present embodiments by having two separate tie-down units 100, as compared to prior art systems that utilize a single, centrally located, winch unit. The use of two, spaced apart units allows a wheelchair having foot rests to be pulled father forward in the securement area, as the footrest may enter the space separating the units. In contrast, this may not be possible with the prior art units, which would otherwise occupy the same space.

Figure 12:
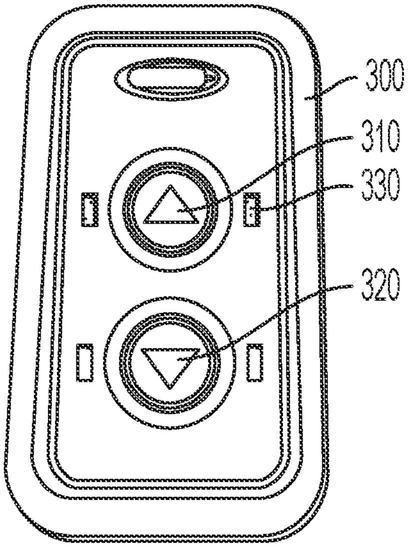
FIG. 12 is a front view of a first embodiment of a control panel for the first embodiment of the incline tie-down system.
Figure 13:
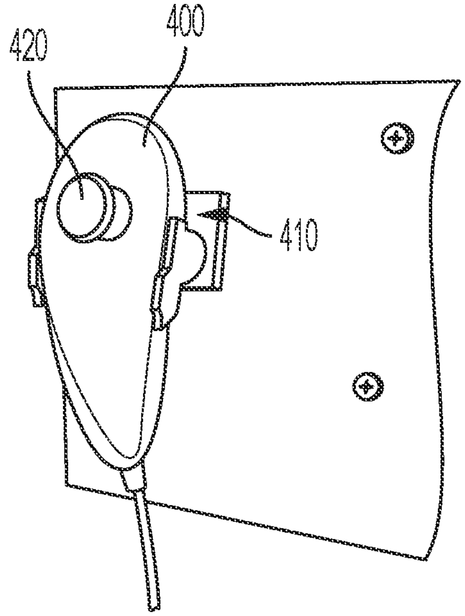
FIG. 13 is a perspective view of a first embodiment of a joystick for the first embodiment of the incline tie-down system.
Figure 14:
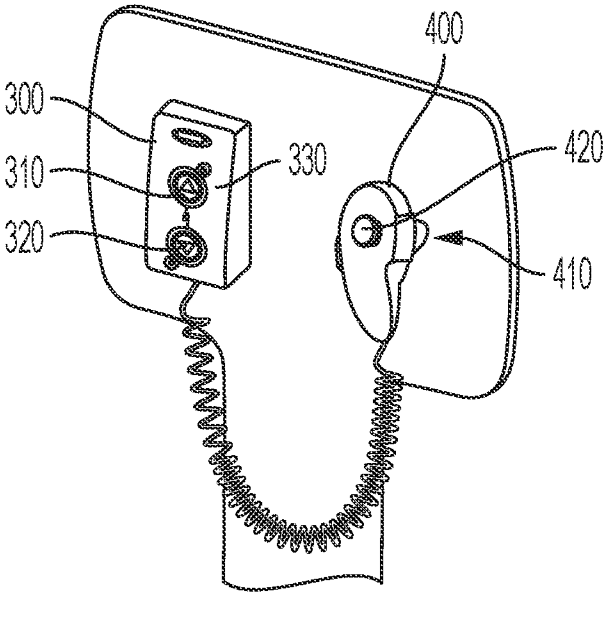
FIG. 14 is a perspective view of a second embodiment of a control panel and joystick of the first embodiment of the incline tie-down system.

FIGS. 12-14 show and describe embodiments of the control panel 300 and joystick 400. The control panel 300 has buttons to switch system 50 modes and may provide a location for the joystick 400 to rest. The joystick 400 is used to control operation of the front tie-down units 100 and to maneuver (steer) the wheelchair 70 during loading and unloading. In general, the control panel 300 includes two buttons, the first button 310 being a lock or "final squeeze" button, and the second button 320 being an unlock or release button. The control panel 300 also includes one or more indication lights 330 that are reflective of the system condition or mode. In one embodiment, the control panel 300 could include LED indicators alerting users to loading (going up), unloading (going down), error codes (e.g., the pattern of flashing lights could indicate specific errors), and interlock (e.g., the unit could flash once the vehicle is safely moving to indicate that it is in a lock mode and joystick/operation is disabled). In another embodiment, the indication lights could be located on other structures in the vehicle. In yet another embodiment, the control panel 300 or other structure in the vehicle could include a reset switch to reboot the system 50 and reactivate normal operation (e.g., if an error code occurs). In yet another embodiment, the system 50 could be programmed where pushing all of the buttons on the control panel 300 at the same time will reset the system. The joystick 400 includes a dead-man (or trigger) button 410 (hidden on the opposite side of the joystick 400 in FIGS. 11-12) and a multi-axis controller, such as a thumbstick 420, or other equivalent controls, such as a touchpad, arrow buttons, track ball, or wheels.

In one embodiment, the control panel 300 could serve as a backup for loading and unloading of the occupant, should the joystick 400 be lost or broken. To serve this purpose, the first and second buttons 310, 320 could having combined functions, where they can be used for loading, unloading, final squeeze, initial release, and belt release. With such an arrangement, however, individual control of the two tie-down units 100 may not be possible. Both of the tie-down units 100 would be activated in the same direction simultaneously. To avoid this result, multiple, directional buttons (e.g., up, down, left, right) could be provided on the control panel 300 or other structure in the vehicle so that individual control of the two tie-down units 100, and thus steering the occupant up/down the ramp 60, will be possible, even in the event that the joystick 400 is lost or broken.

Figure 5:
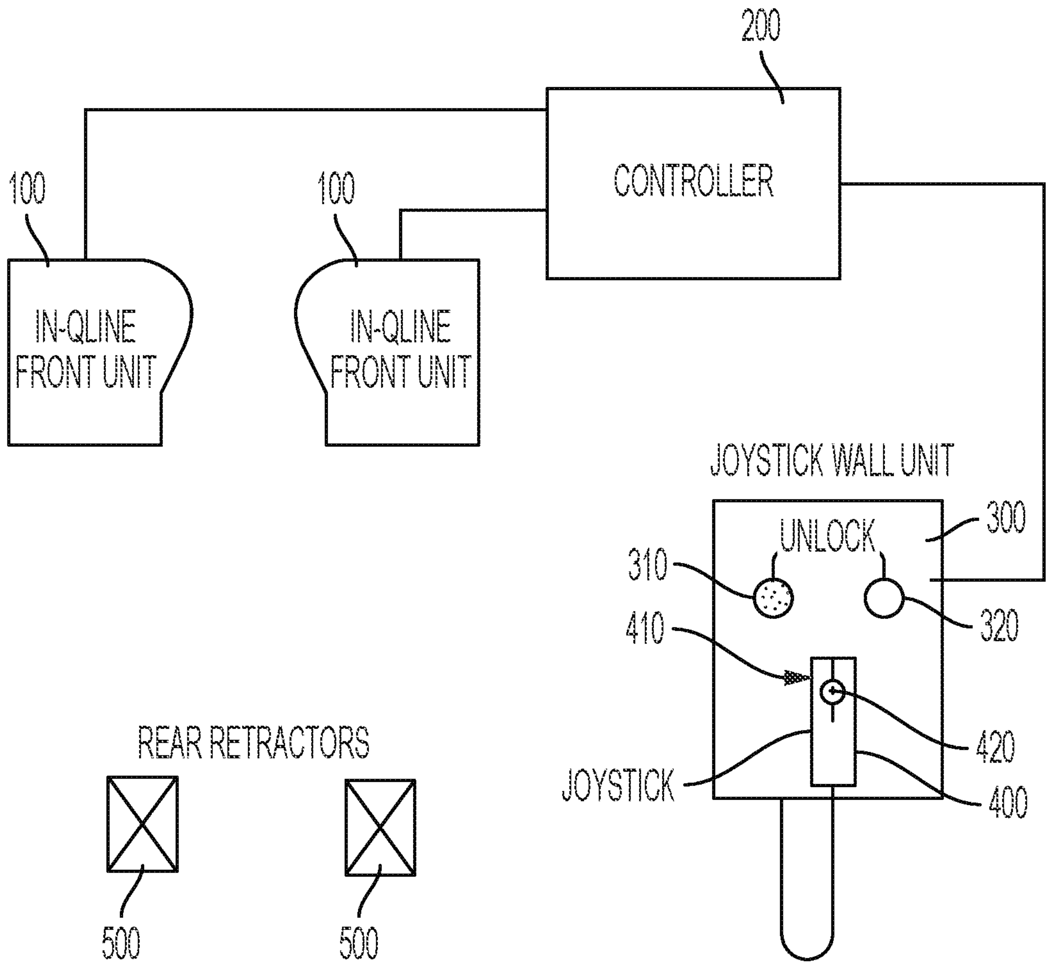
FIG. 5 is a block diagram of the first embodiment of the incline tie-down system.
Figure 7:
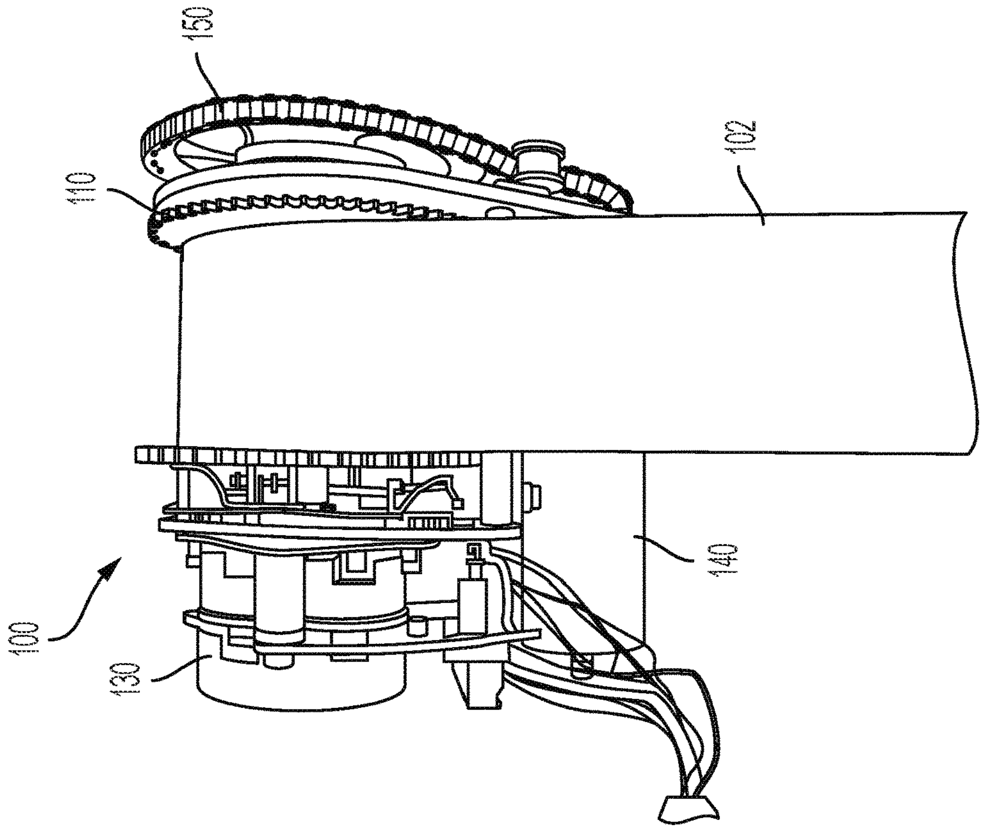
FIG. 7 is a top view of a first embodiment of a right front, tie-down unit (cover removed)
Figure 6:
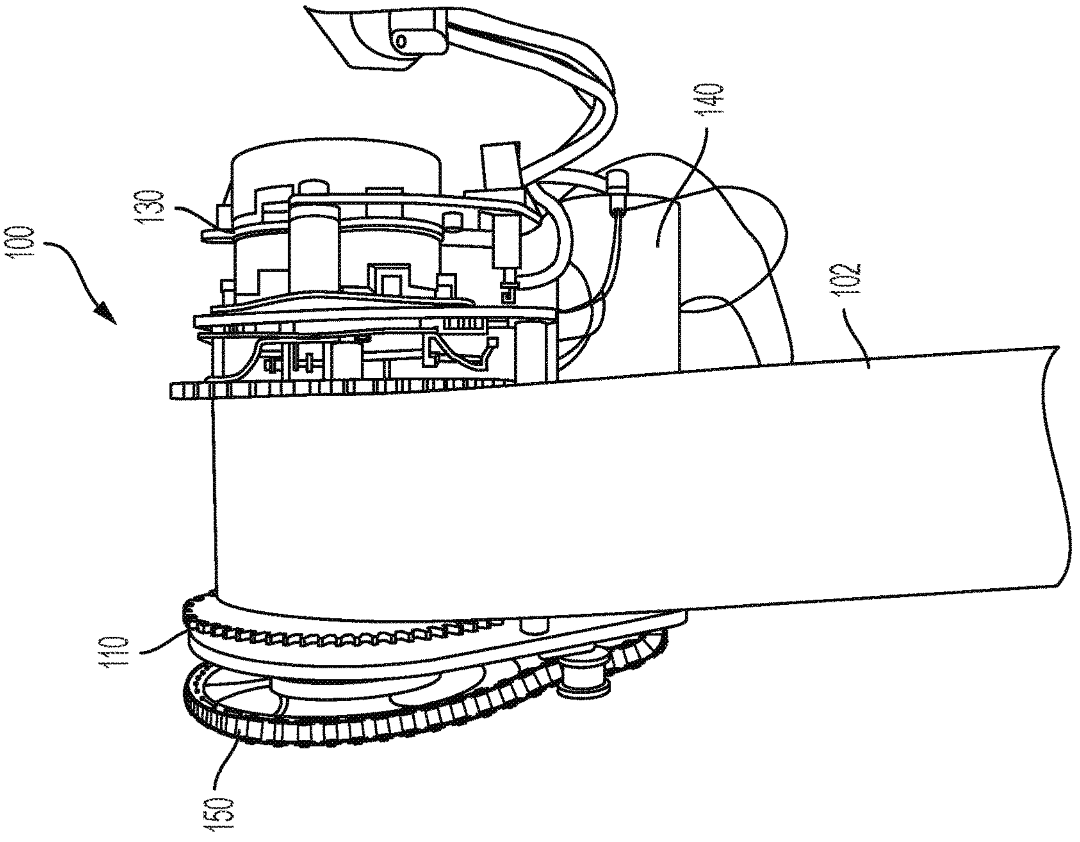
FIG. 6 is a top view of a first embodiment of a left front, tie-down unit (cover removed)

Referring now to FIG. 5, the controller 200 is electrically connected to and in two-way communication with each of the two front tie-down units 100 and with the control panel 300 and joystick 400. In the disclosed embodiment, the controller 200 is a programmable motor controller. In the preferred embodiment, the system 50 is programmed to have several modes: Idle, Release, Loading Wheelchair, Dock Wheelchair, Undock Wheelchair, Unloading Wheelchair, and Fault.

The Idle Mode is the default system condition. The system 50 is on and not in motion. The thumbstick 420 is in the center position and the dead-man button 410 is not engaged.

In the Release Mode, the wheelchair is at the bottom of the ramp and the controller 200 causes the restraints 102 to be released from the wheelchair, which allows the operator to withdraw the restraints 102 and wheelchair attachments 104 (e.g., hooks) from the front tie-down units 100 and secure them to the wheelchair 70. The vehicle operator can place the system 50 in the Release Mode by pressing both buttons 310 and 320 simultaneously. In response to the button push, the controller 200 will cause the pawl release mechanism to push the pawl 160 out of engagement with the ratcheted spool 110 followed by activating the main motors 140 of the front tie-down units 100 in reverse for a predetermined amount of time. It has been found that 30 seconds is sufficient time for the restraints 102 to be withdrawn from the front tie-down units 100 and secured to the wheelchair 70. After the predetermined amount of time has lapsed, the controller 200 stops the motors 140 and causes the pawl release mechanism to allow the pawl 160 to re-engage the ratcheted spool 110. Release Mode can be aborted by moving the thumbstick forward (i.e., up, depending on perspective) for approximately 1 second, or by pressing buttons 310 or 320, which returns the system 50 to the Idle Mode. In an alternative embodiment, the tie-down units 100 could be designed to have a full release, where the motors 140 would not need to be operated in reverse, which would allow the restraints 102 to be taken out quickly, rather than being limited to the speed of the motors 140.

In the Loading Mode, the controller 200 causes the front tie-down units 100 to pull the wheelchair up the ramp 60 of the vehicle. The operator places the system 50 in the Loading Mode by pressing and holding the dead-man button 410 and adjusting the thumbstick 420 forward (up) on the joystick. In response, the controller 200 will cause the locking pawls 160 to engage with the ratcheted spool 110 (if not engaged already). The controller will also engage the motors 140 of the front tie-down units 100 to pull the wheelchair up the ramp 60 of the vehicle. The speed of the motors will be adjusted depending upon how far forward the thumbstick 420 is pushed (the farther the thumbstick is pushed forward from center, the faster the motors will be operated and the faster the wheelchair 70 will be pulled up the ramp). During loading, the operator can make left corrections to the wheelchair 70 path by continuing to push the thumbstick 420 forward and slowly adjusting the thumbstick 420 to the left to correct steering as necessary. In response, the controller 200 will keep the pawls 160 locked and independently adjust the speeds of the left and right motor 140 to help steer while pulling the wheelchair up the ramp. Typically, this will involve slowing down the left motor, increasing the speed of the right motor, or both. The differential in speed between the motors will depend upon how far left the thumbstick 420 is pushed (the further left it is pushed, the larger the differential and the tighter the turn). Right corrections to the wheelchair can be made in a similar manner by continuing to push the thumbstick 420 forward and slowly adjusting the thumbstick 420 to the right. In response, the controller 200 will decrease the speed of the right motor, increase the speed of the left motor, or both. If the dead-man button 410 or the thumbstick 420 is released while loading, the controller 200 causes the motors to stop turning and the system enters the Idle Mode. Since the pawls 160 are already in the "lock" position, the wheelchair 70 will not roll backwards down the ramp 60. Note, however, that it is envisioned that the controller 200 could be programmed to require that the dead-man button 410 only be depressed and released for the system to enter the Loading Mode, as opposed being held depressed during the entire operation. In this case, releasing the dead-man button 410 will not cause the system to enter the Idle Mode.

When pressing forward or backwards on the thumbstick 420, there may be a momentary lag (e.g., around 2 seconds) before the wheelchair 70 moves. To serve as a safety warning, the system 50 can be provided with an audible and/or visual prompt (for example, a buzzer, beeping sound or flashing light) in these momentary sequences to let the operator and wheelchair passenger know that something is about to happen.

As mentioned above, in the first embodiment of the system 50, the pawls 160 will be engaged with the ratcheted spool 110 (if not engaged already) in the Loading Mode. When the wheelchair 70 is being pulled up the ramp 60, the tie-down units 100 will make a "clang-clang-clang" noise as the pawls 160 disengage and reengage with the teeth of the ratcheted spool 110, similar to the sound a roller coaster makes as it goes up a peak just before the drop. In one alternative embodiment, the controller 200 can eliminate the noise by actuating the pawl 160 slightly so that it is moved just past the teeth of the ratcheted spool 110, and therefore can be quickly put back into engagement with the ratcheted spool 110 when the system enters the Idle Mode.

In the Dock Mode, the wheelchair is inside the vehicle, the rear restraints 510 are in place, and the wheelchair is secure. To enter the Dock Mode, the operator pushes lock button 310. In response, the controller 200 causes the motors 140 to do one last short pull, whereby the spool 110 rotates in a forward direction to apply one last pull (referred to as "final squeeze") to tension or stretch the restraints 102, 510 and properly lock and secure the wheelchair 70 in the system 50. In the preferred embodiment, the controller 200 monitors the current being provided to the motors 140 to confirm adequate system tightness. As an alternative to monitoring current, it is contemplated that the controller 200 could alternatively be programmed to operate the motor for a predetermined period of time to confirm tightness.

In the Undock Mode, the wheelchair is inside the vehicle and the rear restraints 510 are in place. However, the system is "loose" whereby the rear restraints 510 can be removed. To enter the Undock Mode, the operator pushes the unlock button 320. In response, the controller 200 will cause the main motors 140 to operate in a forward direction for a short period of time to release pressure between the pawl 160 and spool 110 (to allow a soft unload process to start). Thereafter, the controller 200 will unlock the pawls 160, operate the motors 140 in reverse for a short period of time to loosen the system 50, and then re-lock the pawls 160. At this point in time, the system 50 is loose and the rear restraints 510 can be removed easily.

In the Unloading Wheelchair Mode, the controller 200 causes the front tie-down units 100 to operate in reverse, whereby the weight of the wheelchair pulls the wheelchair 70 down the ramp 60 of the vehicle. The operator places the system 50 in the Unloading Mode by pressing and holding the dead-man button 410 and adjusting the thumbstick 420 backward (down) on the joystick. In response, the controller 200 will cause the main motors 140 to operate in a forward direction for a short period of time to release pressure between the pawl 160 and spool 110 (to allow a soft unload process to start). Thereafter, the controller 200 will unlock the pawls 160 and operate the motors 140 in reverse. As with the forward direction, the speed of the wheelchair 70 depends upon how far the thumbstick 420 is pushed downward away from center. The operator can make left and right corrections to the positioning/direction of the wheelchair by continuing to hold the thumbstick 420 backward while slowly adjusting it to the left or right, as necessary. In response, the controller 200 will make appropriate corrections to the speed of the left and right motors 140. For example, if a left correction is made, the controller 200 will increase the speed of the right motor, decrease the speed of the left motor, or both, which will alter the direction and path of the wheelchair. Similarly, if a right correction is made, the controller 200 will increase the speed of the left motor, decrease the speed of the right motor, or both. As with turns in the forward direction, described above, the motor speed differential and tightness of the turn when operating in reverse will depend upon how far left or right the thumbstick 420 is pushed from center. If while unloading the user releases the dead-man button 410 or the thumbstick 420, the system will enter the Idle Mode. The controller 200 will cause the motors 140 to stop and will lock the pawls 160. As noted above, however, it is envisioned that the controller 200 could be programmed to require that the dead-man button 410 only be depressed and released for the system to enter the Unloading Mode, as opposed being held depressed during the entire operation. In this case, releasing the dead-man button 410 will not cause the system to enter the Idle Mode. If necessary to prevent jerking the wheelchair passenger during entry into Idle mode, the controller 200 will lock the pawls 160 and cause the motors 140 to operate in a forward direction to prevent fast descent of the wheelchair 70 down the ramp 60. Once off the ramp, the restraints 102 can be removed from the wheelchair and walked back to the front tie-down units 100 or placed on the storage bracket (1100). The clutch in the front tie-down units 100 will be loose, allowing the restraints to recoil without using the motors 140.

The controller 200 may be provided with a vehicle interlock, whereby the controller 200 is provided with an indication of whether the vehicle status is safe for operating the system 50 (for example, whether the vehicle ignition is engaged, the ramp is down, and/or the vehicle is in park). If the vehicle status is not safe, the controller 200 can prevent operation of the system 50.

FIGS. 1-2 show generally how the tie-down system 50 is used. Once the vehicle is in a parked position with the ramp 60 lowered, the operator will simultaneously press both buttons 310, 320 on the control panel 300, which will place the tie-down units 100 in the Release Mode. When placed in the release mode, the operator is able to pull the restraints 102 out of the tie-down units 100 and place the attachments 104 on the front of wheelchair 70 frame which is already placed in front of the ramp 60, as shown in FIG. 1.

At this point, the operator will use the joystick 400 to control the movement and speed of the wheelchair forward, backward, left and right. In particular, the driver will press the dead-man button 410 with his or her index finger, which activates the thumbstick 420, while using his or her thumb on the thumbstick 420 to directionally control the wheelchair 70. Once the wheelchair is inside of vehicle, the operator proceeds to secure wheelchair restraints 510 of the rear tie-down units 500 to the rear of the wheelchair 70 frame.

The operator then pushes the lock button 310 which cause the front tie-down units 100 to take the slack out of the system 50 and/or tension the restraints 102, 510 and secure the wheelchair 70 (referred to as the "final squeeze"). After the wheelchair 70 is secured, the operator will secure the wheelchair passenger using an occupant restraint system 520. The wheelchair 70 and wheelchair passenger are shown fully secured in the vehicle in FIGS. 2-4.

To unload the wheelchair 70, once the vehicle is in park and the ramp 60 is down, the operator removes the occupant restraint system 520 and presses the unlock button 320 on the control panel 300. The tension in the system will be released, allowing the operator to remove the restraints 510 of rear tie-down units from the wheelchair 70 frame and store them. Using the joystick 400, as described in more detail above, the wheelchair 70 can be unloaded from the vehicle, down the ramp 60, in a controlled manner.

There are several key features and benefits of the present embodiment, as compared to the prior art:

Eliminates steps and reduces opportunity for driver error or omission: In the prior art systems, Drivers/Operators are typically required to connect and operate separate winch and front tie-down systems which may not be designed to work together. In some cases, prior art winch systems have been used alone to secure wheelchairs by operators who wrongly assume they are crashworthy.

Reduces Equipment: Combination of winch and front tie-down simplifies installation, reduces maintenance required, possibly reduces weight, and keeps the floor clear of unnecessary equipment.

Potential Cost Savings: Customers using rear-entry ramps save on the price of a wheelchair lift, and also save on purchasing a separate front tie-down and winch product.

Facilitates On/Off loading: Helps operators bring a wheelchair passenger into and out of wheelchair position in rear-entry vehicles in a safe and controllable manner.

Reduces Operator Work-Related Injury: Operators are exposed to back and other injuries when required to manually push and pull and/or steer wheelchair passengers up/down ramp, particularly when it comes to heavy occupants and chairs.

Increases Passenger Safety: Reduces liability and possibility for accidents by eliminating manual pushing/pulling/steering of wheelchair occupants up/down an incline by an operator. In the prior art units, passengers must rely on the operator to safely load and unload them, and are exposed to the risk that the operator could easily trip and release the passenger.

Meets Excursions without need for manual pretensioning: The winch is expected to meet applicable present and future excursion limits without need for additional manual pre-tensioning.

Compact Design: The system can be installed under seats or on vertical members, maximizing the floor space.

Dual Independent Control: The tie-down system features separate tie-down units that are able to be independently controlled, allowing greater installation capabilities in varying vehicle layouts. The hand controller/thumb-stick independently controls the front tie-down units to allow the easy maneuvering of the wheelchair occupant up and down the ramp. In the prior art systems, the wheelchairs will not always go up the ramp evenly; as discussed above, this is due to factors such as uneven weight distribution, unevenly pressured tires, and casters. In contrast to the prior art, the independent motor control provided by the present embodiment is critical in that it allows turns and allows the operator to guide wheelchair appropriately. The joystick is designed to behave with backwards logic (i.e., left control is right, and vice versa) in order for the operator to feel like they are "controlling" the wheelchair in an intuitive way (i.e., moving the thumbstick left operates the right tie-down unit and decelerates or deactivates the left tie-down unit in order to "turn" the wheelchair passenger into a left direction).

Reversible/Modular Tie-downs: The front tie-down units can be installed left or right, on floor or wall surfaces, in different vertical or horizontal orientations, allowing for the restraint (e.g., webbing, cable, or other straps) to exit at different angles/directions. This helps to allow installations in varying vehicle layouts (i.e., reversed and placed under a seat, etc.). The cover design also incorporates a multi-position "dust cover" to cover much of the webbing opening, depending on the orientation of the units during installation.

The front tie-down units have a device that senses the amount of webbing inside of the units or otherwise determines that amount (via the use of encoder(s) linked to the spool or associated motor and gears), in order to predetermine a safety stop (i.e., to prevent damage to wheelchair passenger, wheelchair, vehicle, or securement system,). This device can be adjusted to stop the wheelchair in a predetermined location inside the vehicle, by the installer/dealer.

The purpose is to ensure the wheelchair stops at a specific point, for example, at an optimal position for final securement, and/or to reduce the likelihood that an operator accidentally/unintentionally moves the wheelchair too far forward, possibly resulting in damage to chair or occupant. Alternative, equivalent technologies are "parking sensors": to determine the location of the wheelchair (i.e., ultrasonic, IR, and capacitive distance measurement devices, and even encoders on the spool to "know" the positioning of the webbing and/or the chair). Also magnetic pickups in the webbing, along with a pickup sensor would perform a similar function.

Free/Release Mode: Allows operators to quickly and manually pull on the J-Hook ends by increasing motor speed/rpm for approximately 30 seconds. In order to allow release mode, the controller provides additional voltage to the motors allowing them to turn 2× faster in reverse—giving opportunity for the operator to grab the hooks and "pull" them out of the vehicle quickly.

Auto-Retracting/Auto-Locking: the front tie-down unit retractors will retract loose webbing when available (for example, in the event of a crash, or manual returning of hooks). The system also features a clutch mechanism that allows the spool to rotate in one direction (auto-retracting) and be powered/mechanized in the other direction (when being pulled).

Electro-mechanical locking pawl: The locking pawl serves as auto-locking, spring-assisted and can also be by-passed by secondary motor that allows for powered operation (the locking pawl is either in locked/auto-locking position or in electrically-released mode).

Balanced Locking Pawl: in addition to the above, a balanced locking pawl is employed to perform better during crash testing. In particular, the center of gravity of the locking pawl is located at or near the pivot point of the locking pawl. The balanced approach allows for a faster locking response during the rebound (whiplash/return) forces seen in the test environment.

Controlled Unloading: When unloading a passenger (i.e., reversing from top of ramp), the system allows controlled descent of occupant by using the motor as a controlled brake.

Initial Release: The control panel (wall unit) features an "initial release" to allow the operator to "back off" the wheelchair a set distance as to alleviate the tension on the rear-tiedowns to facilitate their removal if required.

Floor mounted Teflon plates: When pulling a wheelchair into the vehicle, at one point the webbing can "drag" or make contact with the floor—resulting in premature abrasion/wear. The use of Teflon plates or other low friction material on the vehicle floor or ramp can mitigate such abrasion/wear.

Figure 15:
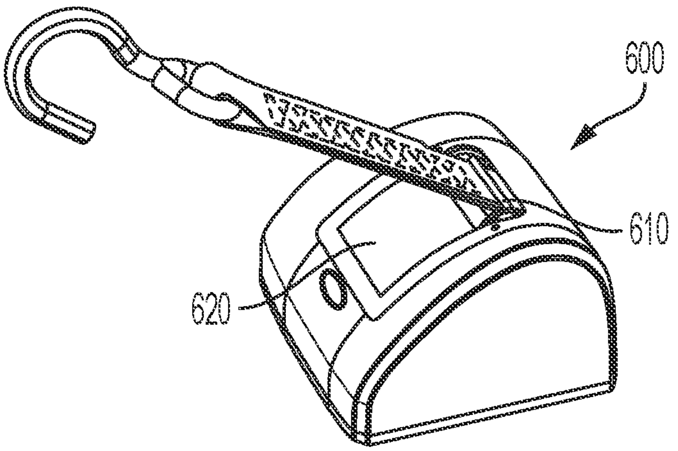
FIG. 15 is a perspective view of a second embodiment of a tie-down unit that incorporates a rotating webbing guide and sliding webbing shield.
Figure 16:
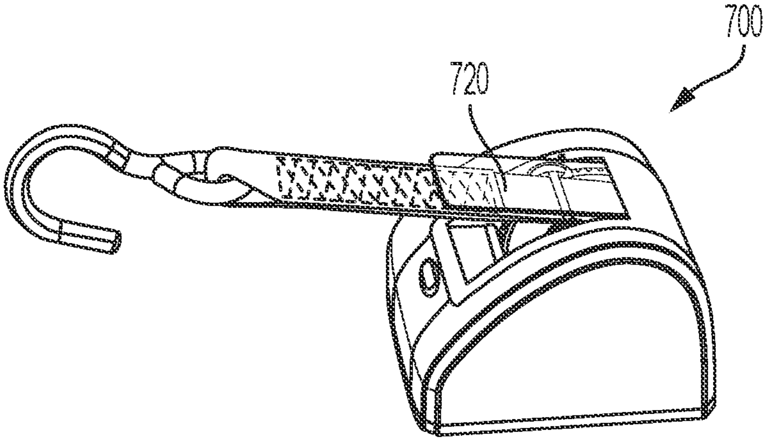
FIG. 16 is a perspective view of a third embodiment of a tie-down unit that incorporates a flap or dust cover to prevent ingress of debris.
Figure 17:
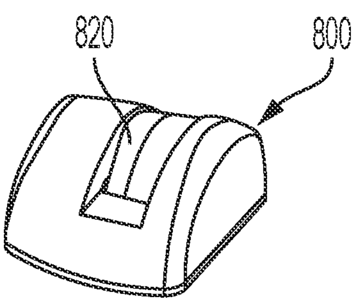
FIG. 17 is a perspective view of a fourth embodiment of a tie-down unit that incorporates a brush member to prevent ingress of debris.

Referring now to FIG. 15, a second embodiment of a tie-down unit 600 is depicted, the internal structure of which is similar to the first embodiment of the tie-down unit 100, but with certain new aspects, some of which are more particularly described in U.S. patent application Ser. No. 15/339,360, which is incorporated by reference. For instance, the tie-down unit 600 is provided with a webbing guide 610 that rotates around at least a portion of the circumference of the retractor spool (not shown). The tie-down unit 600 may also be provided with a sliding webbing shield 620 that follows the travel of the webbing guide 610 to prevent ingress of debris or fluids into the housing of the tie-down unit 600. As shown in FIG. 16, a third embodiment of a tie-down unit 700 is depicted. The third embodiment is substantially the same as the second embodiment, but instead of the webbing shield 620, includes a flap 720 that is fixed at the top of the opening to the housing of the tie-down unit 700 and extends over the restraint and webbing guide to prevent ingress of debris and fluids. As shown in FIG. 17, a fourth embodiment of a tie-down unit 800 is depicted. The fourth embodiment is substantially the same as the second and third embodiments, except it includes brushes or other flexible members 820 on one or more of the edges of the opening of the housing to prevent the ingress of debris and fluids. In alternative embodiments, some combination of the webbing shield 620, flap 720, and/or brushes 820 could be used to prevent ingress of debris and fluids.

Figure 18:
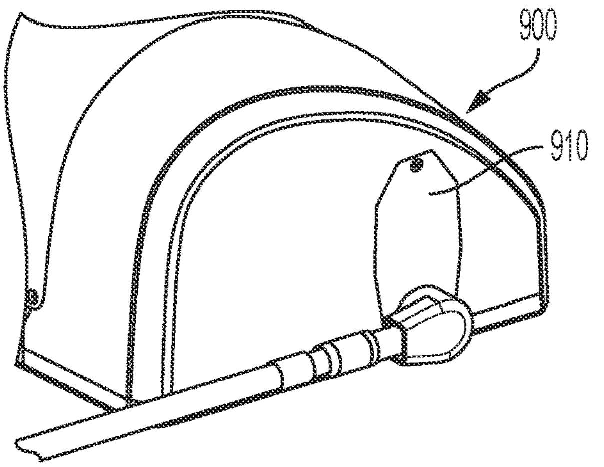
FIG. 18 is a perspective view of a fifth embodiment of a tie-down unit with features enabling easy swapping of devices.
Figure 19:
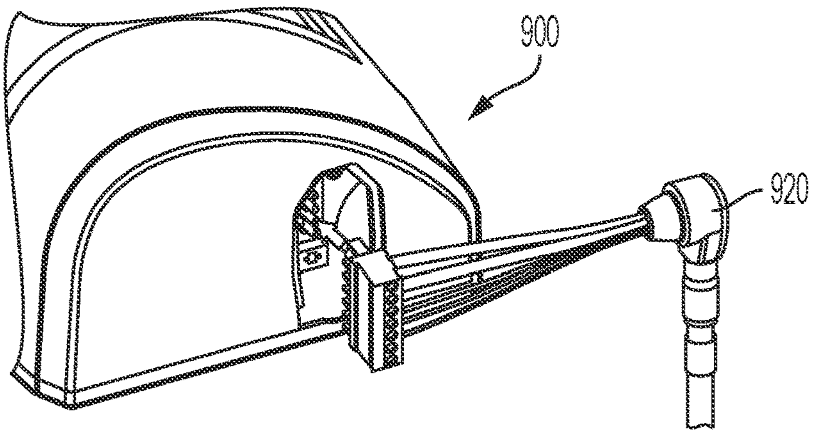
FIG. 19 is a second perspective view of the fifth embodiment.
Figure 20:
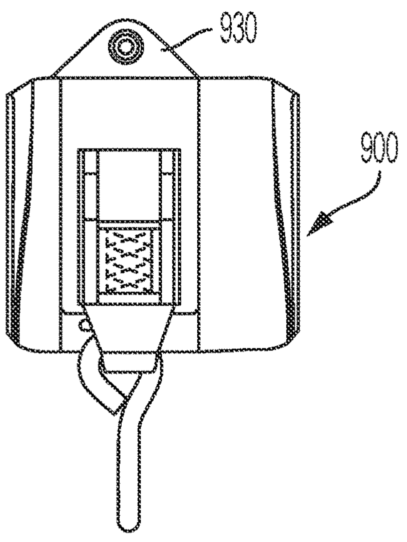
FIG. 20 is a top view of the fifth embodiment.

As shown in FIGS. 18-20, a fifth embodiment of the tie-down unit 900 may include features enabling the unit 900 to be removed and swapped out easily, such as a wire harness door 910 that may be opened to allow easy disconnection of the wiring harness 920. The unit 900 may also include a quick release bracket 930 extending externally from the housing of the unit 900, so that the unit 900 may be easily disconnected and connected to a vehicle.

Figure 21:
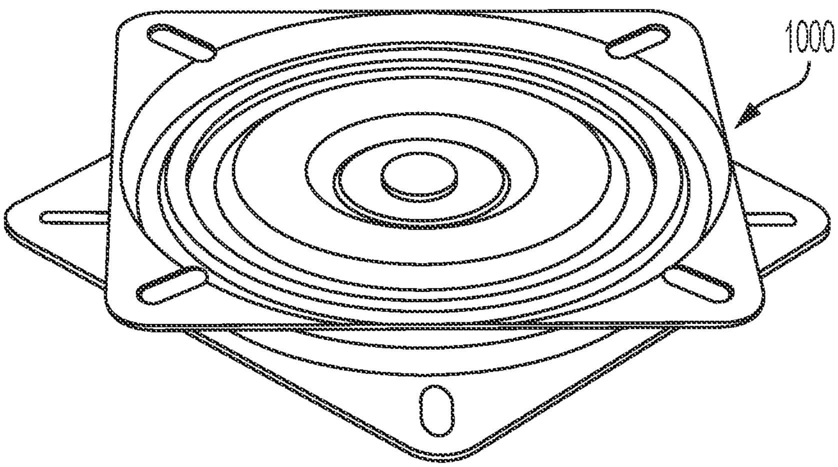
FIG. 21 is a perspective view of a swivel bracket.

As shown in FIG. 21, additional embodiments of the tie-down unit may include a swivel bracket 1000 that is connected between the tie-down unit and the vehicle. The swivel bracket 1000 permits the tie-down units to pivot and align itself with the direction of the pull/load path.

Figure 22:
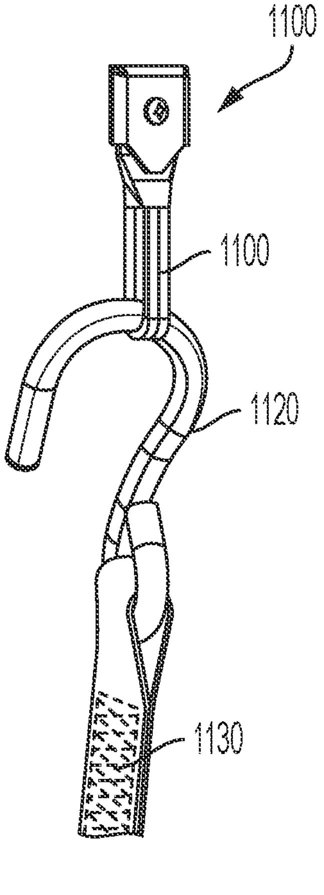
FIG. 22 is a front view of a hook storage bracket.

As shown in FIG. 22, other embodiments may include a hook storage member 1100 that may include a loop 1110 that serves to store/secure the hook 1120 at the end of the restraint 1130 to a vehicle surface. In some embodiments, the loop 1110 may comprise a fabric, webbing, or other "soft" material to allow for securement with minimal or reduced noise (i.e., metal on metal, vibrations and movements from vehicle, etc.). The hook storage member 1100 could be disposed toward the wheelchair entry point into the vehicle, such as the rear of the vehicle or toward the rear of the wheelchair pan 55 that supports the wheelchair, for easier access by the operator of the vehicle. The hook storage member 1100 may prevent damage to the tie-down unit and/or the vehicle if the tie-down unit is accidentally activated while the hook 1120 is in storage (e.g., it will rip the loop 1110 out, and not rip the wall or damage the tie-down unit). The hook storage member 1100 could be designed to take a predetermined amount of force, for example by using loops 1110 of different strength/thickness, or by design of stronger/additional fasteners.

Figure 23:
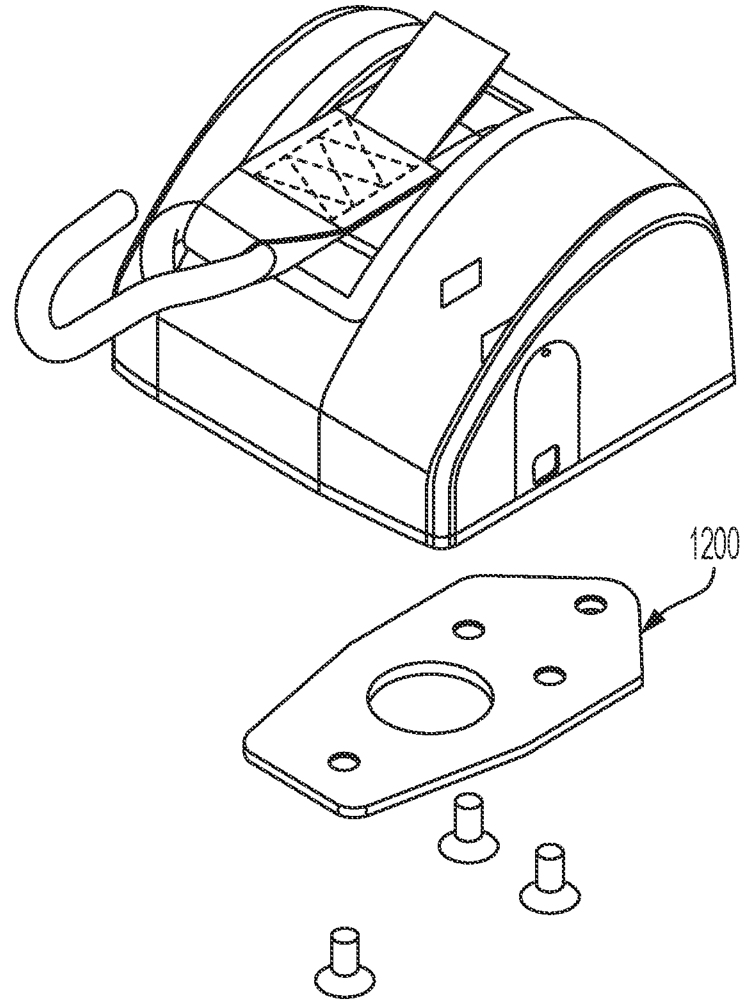
FIG. 23 is a perspective view showing a retrofit bracket.

As shown in FIG. 23, a retrofit bracket 1200 could be used that allows an existing electric retractor to be retrofitted to a tie-down unit disclosed herein. The retrofit bracket 1200 would include a pattern of apertures that corresponds to both the existing electric retractor and the replacement tie-down unit.

Figure 24:
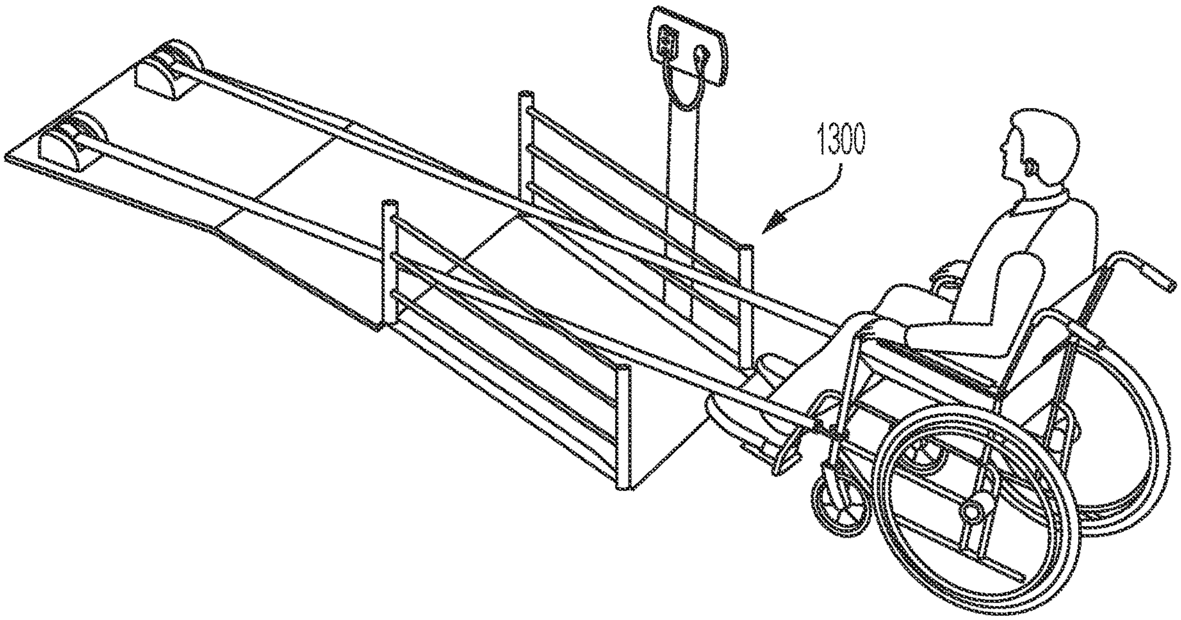
FIG. 24 is a perspective view of an alternative embodiment of the tie-down system that incorporates light curtains.
Figure 25:
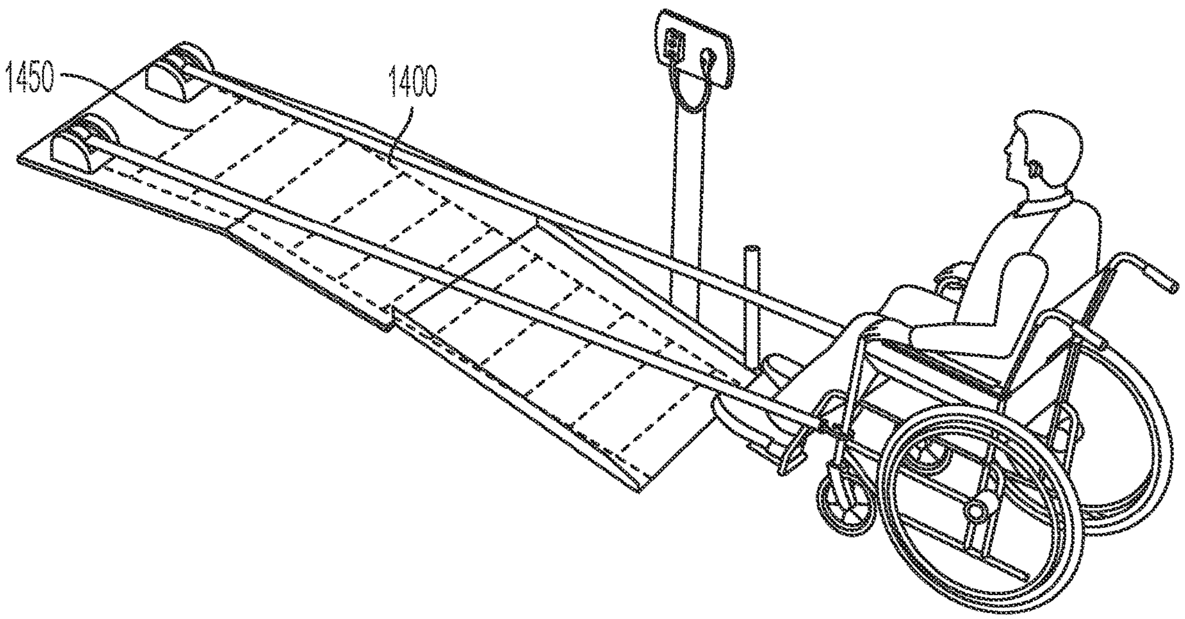
FIG. 25 is a perspective view of another alternative embodiment of the tie-down system that incorporates pressure sensors.

The tie-down system may include various sensors that provide signals to the controller 200 concerning the location of the wheelchair during a loading or unloading operation. For instance, sensors may be incorporated into the hook end of the restraints to provide an indication to the controller that the restraints are reaching the maximum pull distance. For example, wireless positioning sensors with XYZ coordinates, including systems that make use of various optical, radio, or acoustic technologies, could be used. The sensors in the hook end restraints could also provide an indication of the location of the wheelchair throughout the entire loading and unloading operation. Trilateration (3 points) is ideal as it would provide an indication of absolute positioning, but the vertical component is not essential for this application. As shown in FIG. 24, sensors in the form of light curtains 1300 could be incorporated, where the light curtains 1300 would be disposed longitudinally on or near the edges of one or both the wheelchair pan 55 and the ramp 60 to detect when the wheelchair 70 is approaching or about to go off an edge of the wheelchair pan 55 or ramp 60. The light curtains could also be disposed laterally anywhere along the travel path of the wheelchair, for example, at the bottom of the ramp, at the rear or front end of the wheelchair pan, and/or multiple locations there between. In addition, as shown in FIG. 25, ramp imbedded pressure sensors or switches 1400, 1450 could be provided on the wheelchair pan 55 and/or the ramp 60 to provide an indication of the location of the wheelchair. Multiple pressure sensor strips could be used, including longitudinally extending strips 1400 at or near the edges of the wheelchair pan 55 and/or the ramp 60, to provide an indication that the wheelchair 70 is veering off center. In addition, or in the alternative, multiple, laterally extending pressure sensor strips 1450 could be provided on the wheelchair pan 55 and/or the ramp 60, to provide an indication of where the wheelchair is, longitudinally, during the loading and unloading process. In the alternative, a solid surface pressure sensor could be used on one or both of the wheelchair pan 55 and the ramp 60 to provide an indication of both the lateral and longitudinal location of the wheelchair during the loading and unloading process. Other sensors providing an indication of the location of the wheelchair could be used, such as IR, ultrasonic, optical or video/camera systems, capacitive sensors, laser distance measuring, magnetic resonance. In addition, the restraint sensor 120 or various encoders described above could also be used.

Any combination of the sensors described herein could provide an indication of the position, direction, and speed of the wheelchair to the controller 200, whereby that information would be used by the controller 200 to automate the loading/unloading process and/or to prevent damage to the wheelchair or occupant. For instance, the controller 200 could be programmed to stop a loading or unloading operation or automatically turn a wheelchair away from an edge of the ramp 60 or wheelchair pan 55 and redirect it to the center during a loading or unloading operation (by means provided above, by accelerating one of the tie-down units, decelerating the other of the tie-down units, or both), should a sensor provide an indication that the wheelchair is approaching or at such an edge. The controller 200 could also be programmed to stop a loading operation when the wheelchair is properly positioned for final securement in the wheelchair pan 55, or could stop an unloading operation when the wheelchair leaves the ramp 60.

The tie-down system may also include various sensors that provide signals to the controller 200 relating to the condition of the vehicle. For instance, slope-detecting technology, such as gyros, accelerometers, mercury-switches, or other slope detectors, could be used to provide the controller 200 with an indication of whether and to what extent a vehicle is parked on a sloped surface (in any direction, e.g., front to back, side to side, etc.). The controller 200 could be programmed to prevent loading and unloading should the vehicle be parked at a slope that exceeds a predetermined, unsafe slope. The indication of slope could also be used to help the controller 200 keep the wheelchair passenger straight (similar to a lane departure system) during a loading or unloading process, and provide a better approach for the wheelchair. For example, if the vehicle was parked on a left-to-right downward slope (i.e., left side higher than right side), the controller 200 may be programmed to automatically control the right tie-down unit at a higher speed than the left tie-down unit to keep the wheelchair riding straight up the ramp (i.e., "climbing" the positive slope while moving forward), and to resist the wheelchair's tendency to turn downslope (to the right). In a similar manner, the controller 200 may be programmed to provide a differential in speed between the tie-down units 100 to accommodate a wheelchair and passenger with a weight imbalance (e.g., an amputee, or a passenger that leans to one side, where the center of gravity would be shifted to one side or the other). For example, if the weight imbalance would cause the wheelchair to tend to turn to the left when pulled up the ramp, the controller 200 would automatically drive the left motor at a higher speed than the right motor, so that the wheelchair would travel straight up the ramp. This correction would not be apparent to the operator, as the correction would be applied without the operator having to apply any right pressure to the thumbstick.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

The invention claimed is:

1. A system for tracking ingress and egress of a wheelchair into and out of a wheelchair accessible vehicle, comprising:
   a controller;
   one or more sensors configured to output at least one signal indicative of at least one of a location, a direction, and a speed of the wheelchair along at least two axes;
   the controller being programmed to track at least one of the location, the direction, and the speed of the wheelchair along the at least two axes based on the at least one signal.

2. The system of claim 1, wherein the at least one signal is indicative of the location of the wheelchair relative to an access device.

3. The system of claim 1, wherein the at least one signal is indicative of the location of the wheelchair in the wheelchair accessible vehicle.

4. The system of claim 3, wherein the at least one signal is indicative of whether the wheelchair is located in a wheelchair securement area.

5. The system of claim 4, wherein the controller is programmed to stop the wheelchair upon receipt of the at least one signal when indicative of the wheelchair being located in the wheelchair securement area.

6. The system of claim 1, wherein the at least one signal is indicative of whether the wheelchair has departed a wheelchair access device.

7. The system of claim 1, wherein the at least one signal is indicative of the location of the wheelchair on an access device of a wheelchair accessible vehicle.

8. The system of claim 7, wherein the access device has an inboard end adjacent the wheelchair accessible vehicle, an outboard end opposite the inboard end, and a first edge and a second edge extending transverse to and between the inboard end and the outboard end, and wherein the controller is programmed to detect if the wheelchair is approaching at least one of the first edge and the second edge of the access device based on the signal and generate at least one control signal in response thereto.

9. The system of claim 1, wherein the at least one sensor comprises at least one of a position sensor, a light curtain, a pressure sensor, an infrared sensor, an ultrasonic sensor, an optical sensor, a camera, a laser, and a magnetic resonance sensor.

10. The system of claim 1, wherein the at least one signal is indicative of the direction of the wheelchair in the wheelchair accessible vehicle.

11. The system of claim 1, wherein the at least one signal is indicative of the speed of the wheelchair in the wheelchair accessible vehicle.

12. A wheelchair accessible vehicle comprising:
   a wheelchair access device permitting ingress and egress of a wheelchair into and out of the wheelchair accessible vehicle;
   a wheelchair securement system for securing the wheelchair during transit;
   one or more sensors configured to output at least one signal indicative of at least one of a location, a direction, and a speed of the wheelchair along at least two axes; and,
   a controller being programmed to track at least one of the location, the direction, and the speed of the wheelchair along the at least two axes based on the at least one signal.

13. The system of claim 12, wherein the at least one signal is indicative of the location of the wheelchair relative to the wheelchair access device.

14. The system of claim 12, wherein the at least two axes includes a lateral axis and a longitudinal axis.

15. The wheelchair accessible vehicle of claim 12, wherein the at least one signal is indicative of the location of the wheelchair in the wheelchair accessible vehicle.

16. The wheelchair accessible vehicle of claim 15, wherein the at least one signal is indicative of whether the wheelchair is located in a wheelchair securement area.

17. The wheelchair accessible vehicle of claim 12, wherein the wheelchair access device is a ramp and the at least one signal is indicative of the location of the wheelchair on the ramp.

18. The wheelchair accessible vehicle of claim 17, wherein the ramp has an inboard end adjacent the wheelchair accessible vehicle, an outboard end opposite the inboard end, and a first edge and a second edge extending transverse to and between the inboard end and the outboard end, and wherein the controller is programmed to detect if the wheelchair is approaching at least one of the first edge and the second edge of the ramp based on the signal and, in response thereto, generate at least one control signal steering the wheelchair away from the edge.

19. The system of claim 17, wherein the at least one signal is indicative of whether the wheelchair has departed the ramp.

20. The wheelchair accessible vehicle of claim 12, wherein the at least one sensor comprises at least one of a position sensor, a light curtain, a pressure sensor, an infrared sensor, an ultrasonic sensor, an optical sensor, a camera, a laser, and a magnetic resonance sensor.

* * * * *